(12) United States Patent
Nakazono (10) Patent No.: US 12,020,572 B2
(45) Date of Patent: Jun. 25, 2024

(54) INFORMATION PROCESSING DEVICE, INFORMATION PROCESSING METHOD, AND SYSTEM

(71) Applicant: TOYOTA JIDOSHA KABUSHIKI KAISHA, Toyota (JP)

(72) Inventor: Hiroyuki Nakazono, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 185 days.

(21) Appl. No.: 17/682,446

(22) Filed: Feb. 28, 2022

(65) Prior Publication Data

US 2022/0284814 A1 Sep. 8, 2022

(30) Foreign Application Priority Data

Mar. 2, 2021 (JP) ................. 2021-032283

(51) Int. Cl.
G08G 1/16 (2006.01)
B60Q 9/00 (2006.01)
G07C 5/02 (2006.01)
G08G 1/0967 (2006.01)

(52) U.S. Cl.
CPC ............ *G08G 1/166* (2013.01); *B60Q 9/008* (2013.01); *G07C 5/02* (2013.01); *G08G 1/096783* (2013.01); *G08G 1/096791* (2013.01)

(58) Field of Classification Search
CPC ............ G08G 1/166; G08G 1/096783; G08G 1/096791; B60Q 9/008; G07C 5/02
See application file for complete search history.

(56) References Cited

U.S. PATENT DOCUMENTS

| | | | | |
|---|---|---|---|---|
| 7,426,437 B2* | 9/2008 | Breed | ........... | G01S 19/17 340/995.12 |
| 9,646,496 B1* | 5/2017 | Miller | ........... | H04W 4/029 |
| 9,704,396 B1* | 7/2017 | Owens | ........... | G08G 1/0965 |
| 9,824,589 B1* | 11/2017 | Ramirez | ........... | G08G 1/163 |
| 2004/0246144 A1* | 12/2004 | Siegel | ........... | G08G 1/0965 340/902 |
| 2008/0068146 A1* | 3/2008 | Cauldwell | ........... | G08G 1/166 340/435 |
| 2010/0114418 A1* | 5/2010 | Samuel | ........... | G08G 1/167 701/301 |
| 2012/0010762 A1* | 1/2012 | Asano | ........... | G08G 1/166 701/1 |
| 2012/0016581 A1* | 1/2012 | Mochizuki | ........... | G08G 1/167 701/301 |
| 2012/0126997 A1 | 5/2012 | Bensoussan | | |
| 2013/0229289 A1 | 9/2013 | Bensoussan et al. | | |

(Continued)

FOREIGN PATENT DOCUMENTS

| CN | 103338974 A | 10/2013 |
|---|---|---|
| CN | 103538540 A | 1/2014 |

(Continued)

*Primary Examiner* — Chico A Foxx
(74) *Attorney, Agent, or Firm* — Sughrue Mion, PLLC (57) ABSTRACT

In a case where it is determined that there is a possibility of a collision between a subject vehicle and an other vehicle, an information processing device causes a first alert device for issuing an alert to a driver of the subject vehicle to issue the alert when the first alert device is in an active state, and transmits alert information to the other vehicle when the first alert device is in an inactive state.

20 Claims, 9 Drawing Sheets

(56) References Cited

U.S. PATENT DOCUMENTS

| | | | |
|---|---|---|---|
| 2013/0342338 A1 | 12/2013 | Green et al. | |
| 2013/0342364 A1 | 12/2013 | Grimm et al. | |
| 2013/0342365 A1 | 12/2013 | Kiefer et al. | |
| 2014/0132405 A1 | 5/2014 | Kiefer et al. | |
| 2014/0288774 A1* | 9/2014 | Morita | H04W 72/02 |
| | | | 701/409 |
| 2015/0042491 A1 | 2/2015 | Burnison et al. | |
| 2015/0148985 A1* | 5/2015 | Jo | B60W 30/095 |
| | | | 701/1 |
| 2016/0280132 A1* | 9/2016 | Palanimuthu | G08G 1/163 |
| 2017/0137025 A1 | 5/2017 | Muto et al. | |
| 2017/0186320 A1* | 6/2017 | Lai | H04L 67/12 |
| 2018/0144637 A1 | 5/2018 | Ikedo et al. | |
| 2018/0308351 A1* | 10/2018 | Yokoi | G08G 1/0112 |
| 2019/0143968 A1* | 5/2019 | Song | G06V 20/588 |
| | | | 701/301 |
| 2020/0193813 A1* | 6/2020 | Sui | G05D 1/0088 |
| 2021/0306823 A1* | 9/2021 | Ahire | H04W 4/023 |
| 2022/0194368 A1* | 6/2022 | Nemoto | G08G 1/163 |
| 2022/0319324 A1* | 10/2022 | Allen | G07C 5/04 |
| 2023/0124220 A1* | 4/2023 | Hayward | G01S 19/47 |
| | | | 370/312 |

FOREIGN PATENT DOCUMENTS

| | | | |
|---|---|---|---|
| JP | 2015-171851 A | 10/2015 | |
| JP | 2016-021125 A | 2/2016 | |
| JP | 2018-081613 A | 5/2018 | |
| WO | 2013/124904 A1 | 8/2013 | |

\* cited by examiner

INTERSECTION INFORMATION

| INTERSECTION ID | ALIGNMENT INFORMATION | TRAFFIC LIGHT INFORMATION |
|---|---|---|
| I001 | ... | ... |

Fig. 4

VEHICLE INFORMATION

| VEHICLE ID | POSITION INFORMATION | SPEED | TRAVELING DIRECTION |
|---|---|---|---|
| V003 | ... | ... | ... |

INFORMATION PROCESSING DEVICE, INFORMATION PROCESSING METHOD, AND SYSTEM

CROSS REFERENCE TO THE RELATED APPLICATION

This application claims the benefit of Japanese Patent Application No. 2021-032283, filed on Mar. 2, 2021, which is hereby incorporated by reference herein in its entirety.

BACKGROUND

Technical Field

The present disclosure relates to a technology for reducing a collision risk of a vehicle.

Description of the Related Art

Patent Literature 1 discloses a driving support apparatus that issues an alert to a driver when a subject vehicle is turning right/left at a turning place. With the driving support apparatus disclosed in Patent Literature 1, in a case where it is determined that the subject vehicle is starting to turn left or right, an expected route of the subject vehicle is estimated. Furthermore, a request signal for issuing an alert to the driver of the subject vehicle is generated based on object information about an object present in a periphery of the subject vehicle and the expected route of the subject vehicle.

Patent Literature 1: Japanese Patent Laid-Open No. 2018-081613

Patent Literature 2: Japanese Patent Laid-Open No. 2016-21125

SUMMARY

An object of the present disclosure is to provide a technology that is capable of reducing a risk of collision between a subject vehicle and another vehicle.

An information processing apparatus according to a first mode of the present disclosure is an information processing device comprising a controller configured to, in a case where it is determined that there is a possibility of a collision between a subject vehicle and an other vehicle:

cause a first alert device for issuing an alert to a driver of the subject vehicle to issue an alert when the first alert device is in an active state, and transmit alert information to the other vehicle when the first alert device is in an inactive state.

An information processing method according to a second mode of the present disclosure is an information processing method performed by a computer, the method comprising:

determining whether or not there is a possibility of a collision between a subject vehicle and an other vehicle; and causing a first alert device for issuing an alert to a driver of the subject vehicle to issue an alert when the first alert device is in an active state, and transmitting alert information to the other vehicle when the first alert device is in an inactive state, in a case where it is determined that there is the possibility of a collision between the subject vehicle and the other vehicle.

A system according to a third mode of the present disclosure is a system including a first on-board device and a first alert device mounted in a subject vehicle, and a second on-board device and a second alert device mounted in an other vehicle, wherein the first alert device is a device that issues an alert to a driver of the subject vehicle, the second alert device is a device that issues an alert to a driver of the other vehicle, and in a case where it is determined that there is a possibility of a collision between the subject vehicle and the other vehicle, the first on-board device causes the first alert device to issue the alert when the first alert device is in an active state, and transmits alert information to the second on-board device when the first alert device is in an inactive state, the alert information being for causing the second alert device to issue the alert.

According to the present disclosure, a risk of collision between the subject vehicle and another vehicle may be reduced.

DESCRIPTION OF THE EMBODIMENTS

An information processing device according to the present disclosure includes a controller. The controller may determine whether or not there is a possibility of a collision between a subject vehicle and another vehicle. This determination may be performed based on a driving state of the subject vehicle and a driving state of another vehicle present in the periphery of the subject vehicle. In the case where it is determined that there is a possibility of a collision between the subject vehicle and the other vehicle, when a first alert device is in an active state, the controller may cause the first alert device to issue an alert. The first alert device is a device that is mounted in the subject vehicle, and may be a device that issues an alert to a driver of the subject vehicle.

When an alert is issued by the first alert device, the driver of the subject vehicle may grasp that there is a possibility of a collision between the subject vehicle and the other vehicle.

As a result, the driver of the subject vehicle may perform a vehicle operation to avoid the collision between the subject vehicle and the other vehicle.

However, there is a case where the first alert device in the subject vehicle is in an inactive state. For example, in a case where power of the first alert device is off, or in a case where the first alert device is broken, the first alert device is in an inactive state. When the first alert device is in an inactive state, the first alert device is not able to issue an alert. Accordingly, in a case where it is determined that there is a possibility of a collision between the subject vehicle and the other vehicle, when the first alert device is in an inactive state, the controller may transmit alert information to the other vehicle.

The alert information may be information for notifying a driver of the other vehicle that there is a possibility that the other vehicle will collide with the subject vehicle. For example, the alert information may be information for causing a second alert device in the other vehicle to issue an alert, the second alert device being for issuing an alert to the driver of the other vehicle. When the alert information transmitted from the subject vehicle is received by the other vehicle, the driver of the other vehicle may grasp that there is a possibility of a collision between the other vehicle and the subject vehicle. As a result, the driver of the other vehicle may perform a vehicle operation to avoid the collision between the subject vehicle and the other vehicle.

As described above, according to the present disclosure, when there is a possibility that the subject vehicle will collide with another vehicle, if an alert may be issued to the driver of the subject vehicle, the driver of the subject vehicle may be made to perform a vehicle operation for avoiding the collision. Furthermore, in a case where an alert may not be issued to the driver of the subject vehicle, the driver of the other vehicle may be made to perform a vehicle operation to avoid the collision. Accordingly, a risk of a collision between the subject vehicle and the other vehicle may be reduced.

In the following, specific embodiments of the present disclosure will be described with reference to the drawings. Dimensions, materials, shapes, relative positions and the like of structural components described in the present embodiments are not intended to limit the technical scope of the present disclosure unless stated otherwise.

First Embodiment

Outline of System

Figure 1:
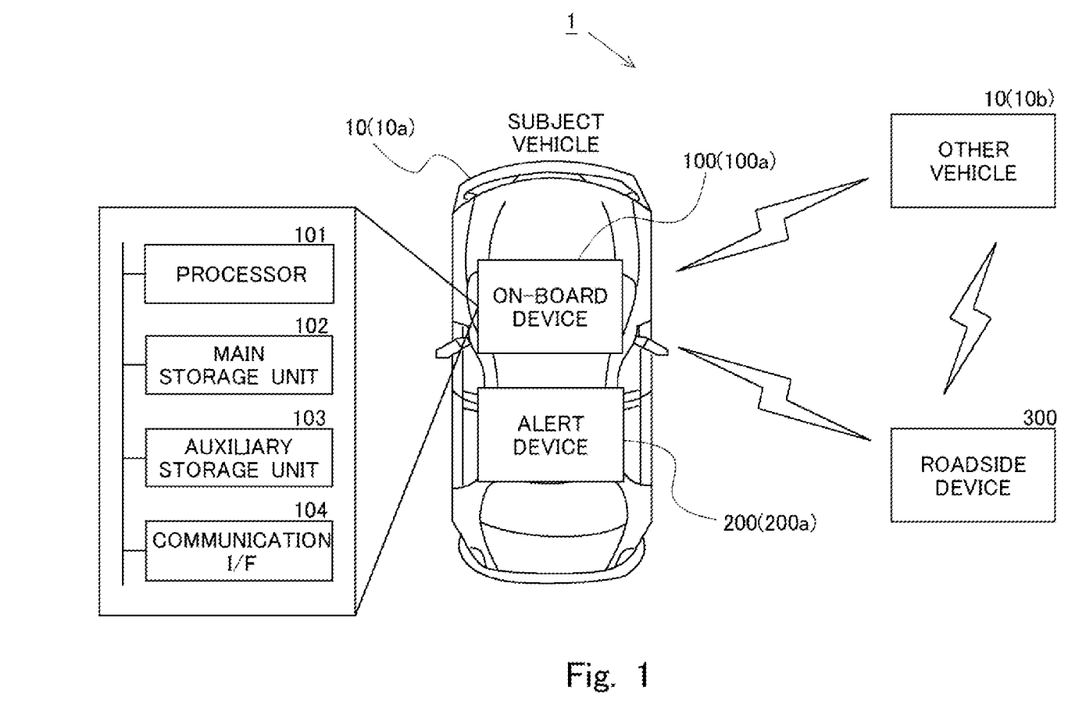
FIG. 1 is a diagram illustrating a schematic configuration of an alert system.
Figure 2:
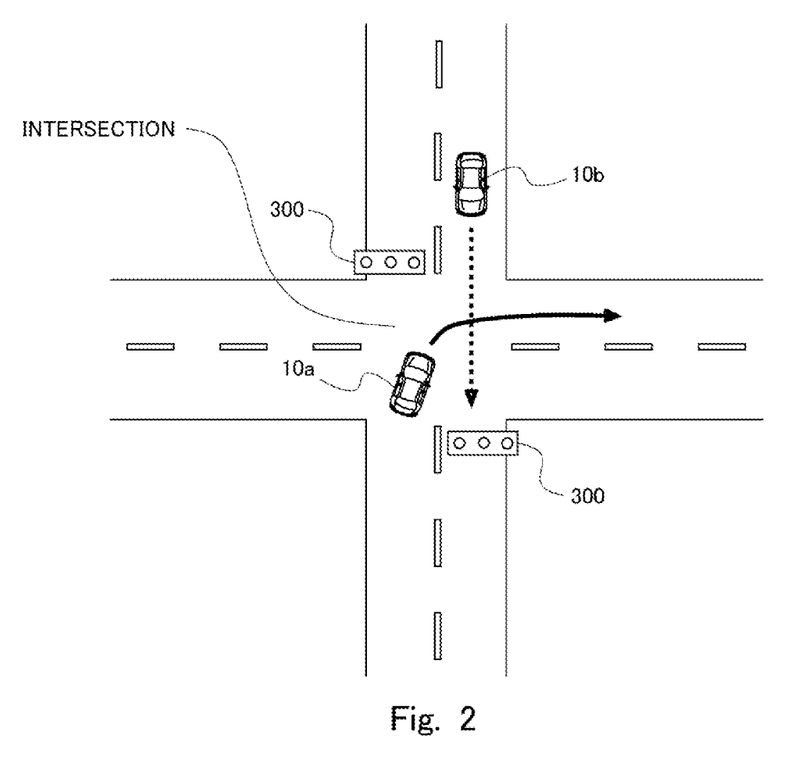
FIG. 2 is a diagram illustrating a first example of a traffic state where an alert is to be issued by the alert system.

An outline of an alert system according to a present embodiment will be given with reference to FIGS. 1 and 2. The alert system is a system for issuing an alert to a driver in a case where there is a possibility of a collision between vehicles. FIG. 1 is a diagram illustrating a schematic configuration of the alert system. FIG. 2 is a diagram illustrating a first example of a traffic state where an alert is to be issued by the alert system.

An alert system 1 includes an on-board device 100 and an alert device 200 mounted in every vehicle 10, and a roadside device 300. Additionally, in the following, in the case where a subject vehicle and another vehicle are to be distinguished from each other, a reference sign 10*a* will be used for the subject vehicle, and a reference sign 10*b* will be used for the other vehicle. Furthermore, the on-board device 100 and the alert device 200 mounted in the subject vehicle 10*a* will be referred to as a first on-board device 100*a* and a first alert device 200*a*, respectively. Furthermore, the on-board device 100 and the alert device 200 mounted in the other vehicle 10*b* will be referred to as a second on-board device 100*b* and a second alert device 200*b*, respectively.

The roadside device 300 is a device that provides information to the vehicles 10 traveling through an intersection and the vehicles 10 traveling in the periphery of the intersection. The roadside device 300 includes a computer. Moreover, the roadside device 300 includes a traffic signal installed at the intersection. The roadside device 300 controls light of the traffic signal.

In the alert system 1, vehicle-to-vehicle communication is performed between the vehicles 10 that are present within a predetermined communicable range. Vehicle-to-vehicle communication is performed by the on-board device 100 mounted in each vehicle 10. Furthermore, road-to-vehicle communication is performed between the vehicle 10 and the roadside device 300 that are present within a predetermined communicable range. Road-to-vehicle communication is also performed by the on-board device 100 mounted in each vehicle 10.

The on-board device 100 includes a computer that can be mounted in the vehicle 10. The computer configuring the on-board device 100 includes a processor 101, a main storage unit 102, an auxiliary storage unit 103, and a communication interface (a communication I/F) 104.

The processor 101 is a central processing unit (CPU) or a digital signal processor (DSP), for example. The main storage unit 102 is a random access memory (RAM), for example. The auxiliary storage unit 103 is a read only memory (ROM), a hard disk drive (HDD), or a flash memory, for example. The auxiliary storage unit 103 may further include a removable medium (a removable recording medium). The removable medium here is a USB memory, an SD card, or a disk recording medium such as a CD-ROM, a DVD disc or a Flu-ray disc, for example. The communication I/F 104 is an interface for wirelessly performing vehicle-to-vehicle communication and road-to-vehicle communication. For example, the communication I/F 104 communicates with the on-board device of another vehicle and the roadside device by dedicated short-range communications (DSRC).

The auxiliary storage unit 103 stores an operating system (OS), various programs, various information tables and the like. A process for issuing an alert, as described later, is implemented by the processor 101 loading a program stored in the auxiliary storage unit 103 into the main storage unit 102 and executing the same, Additionally, one or some or ail of functions of the on-board device 100 may alternatively be implemented by a hardware circuit such as an ASIC or an FPGA, Moreover, the on-board device 100 does not necessarily have to be implemented by a single physical configuration, and may alternatively be configured by a plurality of computers that operate in conjunction with each other.

The alert device 200 is a device that issues an alert to the driver of the vehicle 10. This alert is an alert warning of a possibility of a collision between the subject vehicle 10*a* and the other vehicle 10*b*. The alert device 200 issues the alert by receiving an instruction from the on-board device 100. For example, the alert device 200 may issue the alert through audio output, image output to an on-board monitor, or lighting of a warning light. Additionally, power of the alert device 200 may be turned on or off to switch between active/inactive of an alert function.

Now, a traffic state illustrated in FIG. 2 will be described. Additionally, in FIG. 2, a solid-line arrow indicates a traveling direction of the subject vehicle 10*a*, and a dashed-line arrow indicates a traveling direction of the other vehicle 10*b*.

In FIG. 2, the subject vehicle 10a is in an intersection. Moreover, the subject vehicle 10a is about to turn right at the intersection. For its part, the other vehicle 10b is in an opposite lane. Moreover, the other vehicle 10b is about to enter the intersection. In such a state, if the driver of the subject vehicle 10a drives the subject vehicle 10a without noticing the other vehicle 10b, the subject vehicle 10a will possibly collide with the other vehicle 10b.

Accordingly, in the alert system 1, at a time when the subject vehicle 10a is to travel through an intersection, the first on-board device 100a receives intersection information from the roadside device 300 through road-to-vehicle communication. The intersection information indicates the state of the intersection. Furthermore, the first on-board device 100a receives vehicle information from the second on-board device 100b of the other vehicle 10b through vehicle-to-vehicle communication. The vehicle information is information indicating a driving state of the vehicle 10 (in this case, the other vehicle 10b). The first on-hoard device 100a determines whether or not there is a possibility of a collision between the subject vehicle 10a and the other vehicle 10b, based on the intersection information and the vehicle information that are received. Additionally details of the intersection information and the vehicle information will be given later.

In the case where is it determined that there is a possibility of a collision between the subject vehicle 10a and the other vehicle 10b, when the first alert device 200a is in an active state, the first on-board device 100a causes the first alert device 200a to issue an alert. However, the first alert device 200a is sometimes in an inactive state in such a situation. For example, in the case where power of the first alert device 200a is intentionally or unintentionally turned off by the driver, the first alert device 200a is in an inactive state. Moreover, the first alert device 200a may also be placed in an inactive state due to failure.

When the first alert device 200a is in an inactive state, the first alert device 200a is not able to issue an alert to the driver of the subject vehicle 10a. Accordingly, in the case where it is determined that there is a possibility of a collision between the subject vehicle 10a and the other vehicle 10b, when the first alert device 200a is in an inactive state, the first on-board device 100a transmits alert information to the other vehicle 10b through vehicle-to-vehicle communication. The alert information is information for causing the second alert device 200b in the other vehicle 10b to issue an alert.

When the alert information is transmitted by the first on-board device 100a, the alert information is received by the second on-board device 100b of the other vehicle 10b. When the alert information is received, the second on-board device 100b causes the second alert device 200b to issue an alert.

With the alert system 1 as described above, when there is a possibility of a collision between the subject vehicle 10a and the other vehicle 10b, if the first alert device 200a is in an active state, an alert may be issued to the driver of the subject vehicle 10a. As a result, the driver of the subject vehicle 10a may be made to perform a vehicle operation to avoid the collision. Furthermore, when there is a possibility of a collision between the subject vehicle 10a and the other vehicle 10b, if the first alert device 200a is in an inactive state, an alert may be issued to the driver of the other vehicle 10b. As a result, the driver of the other vehicle 10b may be made to perform a vehicle operation to avoid the collision. Accordingly, a risk of the subject vehicle 10a colliding with the other vehicle 10b may be reduced.

Additionally, in the present embodiment, the first on-board device 100a corresponds to the "information processing device" according to the present disclosure. Furthermore, in the present embodiment, the first alert device 200a corresponds no the "first alert device" according no the present disclosure, and the second alert device 200b corresponds to the "second alert device" according to the present disclosure.

Functional Configuration

Figure 3:
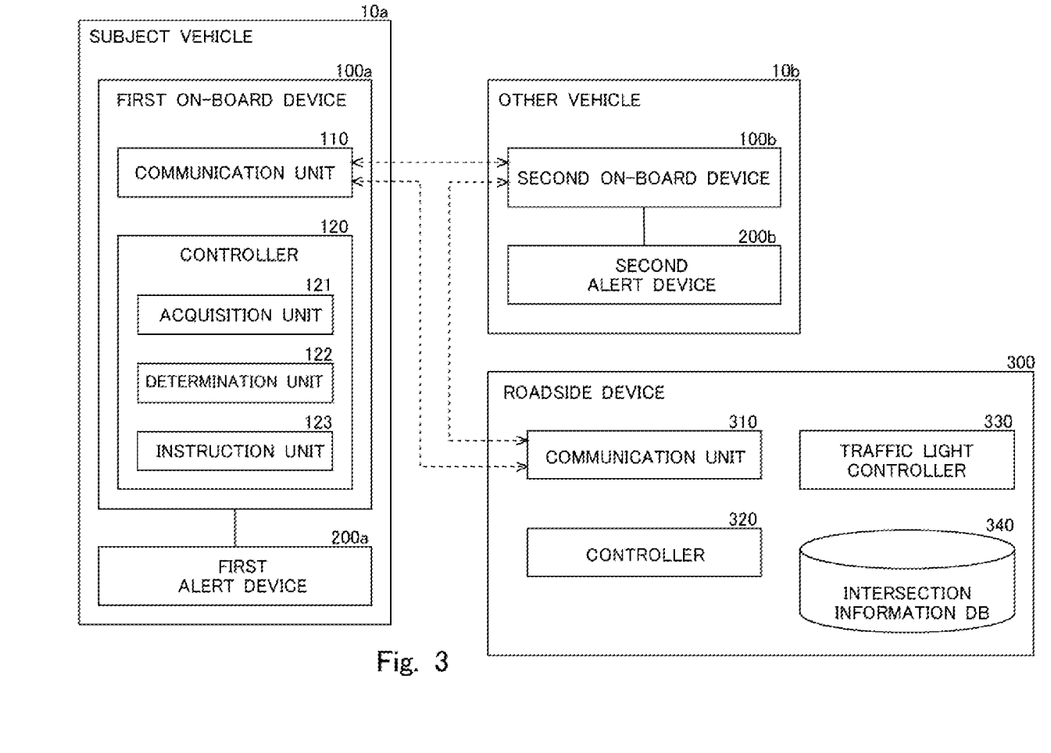
FIG. 3 is a block diagram schematically illustrating an example of a functional configuration of each of a first on-board device and a roadside device according to a first embodiment.

Now, a functional configuration of each of the on-board device 100 and the roadside device 300 configuring the alert system 1 according to the present embodiment will be described with reference to FIG. 3. FIG. 3 is a block diagram schematically illustrating an example of the functional configuration of each of the first on-board device 100a and the roadside device 300 according to the present embodiment. Additionally, the functional configuration of the second on-board device 100b is the same as that of the first on-board device 100a. Accordingly, in the following, the configuration of the on-board device 100 will be described as the configuration of the first on-board device 100a.

Roadside Device

The roadside device 300 includes, as functional units, a communication unit 310, a controller 320, a traffic light controller 330, and an intersection information database (an intersection information DB) 340, The communication unit 310 includes a function of communicating with the vehicles 10 traveling through the intersection and the vehicles 10 traveling in the periphery of the intersection. That the communication unit 310 includes a function of performing road-to-vehicle communication with the on-board device 100 of the vehicle 10 that is present within a predetermined communicable range. The communication unit 310 may be implemented by a communication interface of a computer configuring the roadside device 300.

The controller 320 includes a function of performing arithmetic processing for controlling road-to-vehicle communication by the roadside device 300. The traffic light controller 330 includes a function of performing arithmetic processing for controlling light of the traffic signal included in the roadside device 300. The controller 220 and the traffic light controller 330 may be implemented by a processor of the computer configuring the roadside device 300. Data for controlling light of the traffic signal included in the roadside device 300 (data about a signal cycle, a timetable, and the like) is stored in the intersection information DB 340. Furthermore, information indicating road alignment at the intersection is stored in the intersection information DB 340.

Figure 4:
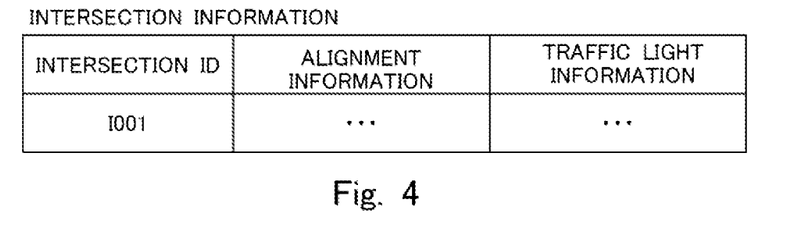
FIG. 4 is a diagram illustrating an example of a table structure of intersection information.

The traffic light controller 330 controls the light of the traffic signal based on the data stored in the intersection information DB 340. Additionally, in the case where a plurality of traffic signals are installed at the intersection for lanes that intersect each other, light of each traffic signal is associated and controlled by the traffic light controller 330. Furthermore, the controller 320 creates the intersection information indicating the state of the intersection, based on the data stored in the intersection information PB 340. Furthermore, the controller 320 performs a process of broadcasting the intersection information every predetermined period of time (for example, every 100 ms) using the communication unit 310. FIG. 4 is a diagram illustrating an example of a table structure of the intersection information that is broadcast by the roadside device 300. As illustrated in FIG. 4, an intersection information table includes an intersection ID field, an alignment information field, and a traffic light information field. An intersection ID that is identification information for identifying the intersection where the roadside device 300 is installed is input in the intersection ID field. Information indicating the road alignment at the intersection is input in the alignment information field. Information indicating a current state of the light of the traffic signal at the intersection is input in the traffic signal information field.

On-Board Device

As described above, the first on-board device 100a is mounted in the subject vehicle 10a, together with the first alert device 200a. The first on-board device 100a includes, as functional units, a communication unit 110 and a controller 120. The communication unit 110 includes a function of performing vehicle-to-vehicle communication with the second on-board device 100b of the other vehicle 10b that is present within a predetermined communicable range. Furthermore, the communication unit 110 includes a function of performing road-to-vehicle communication with the roadside device 300 that is present within a predetermined communicable range. The communication unit 110 may be implemented by the communication I/F 104.

Figure 5:
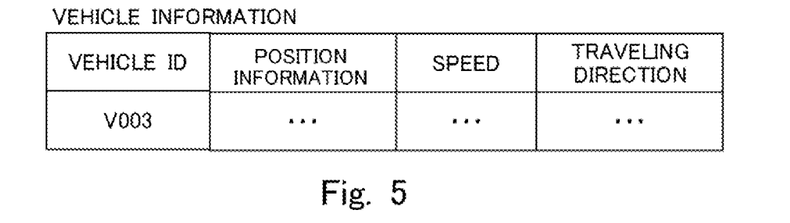
FIG. 5 is a diagram illustrating an example of a table structure of vehicle information.

The controller 120 includes a function of performing arithmetic processing for controlling the first on-board device 100a. The controller 120 may be implemented by a processor. The controller 120 creates the vehicle information indicating the driving state of the subject vehicle 10a. Furthermore, the controller 120 performs a process of broadcasting the vehicle information every predetermined period of time (for example, every 100 ms) using the communication unit 110. FIG. 5 is a diagram illustrating an example of a table structure of the vehicle information that is broadcast by the first on-board device 100a. As illustrated in FIG. 5, a vehicle information table includes a vehicle ID field, a position information field, a speed field, and a traveling direction field. A vehicle ID that is identification information for identifying the subject vehicle 10a is input in the vehicle ID field. Information indicating a current position of the subject vehicle 10a is input in the position information field. Information indicating a speed of the subject vehicle 10a is input in the speed field. Information indicating a traveling direction of the subject vehicle 10a is input in the traveling direction field. Additionally, information pieces input in the vehicle information table are input based on detection values of various sensors provided in the vehicle 10, such as a global positioning system (GPS) device, a speed sensor, a brake sensor, and a steering sensor. Moreover, the vehicle information may include information indicating the driving state of the vehicle 10, in addition to the information pieces illustrated in FIG. 5.

Furthermore, the controller 120 performs a process of receiving, using the communication unit 110, the vehicle information that is broadcast by the second on-board device 100b of the other vehicle 10b that is present within a predetermined communicable range (that is, the vehicle information indicating the driving state of the other vehicle 10b). Moreover, the controller 120 performs a process of receiving, using the communication unit 110, the intersection information that is broadcast by the roadside device 300 that is present within a predetermined communicable range.

Furthermore, an acquisition unit 121 of the controller 120 acquires the vehicle information on the subject vehicle 10a, the vehicle information on the other vehicle 10b received from the second on-board device 100b, and the intersection information received from the roadside device 300. Additionally, in the following, the vehicle information on the subject vehicle 10a may sometimes be referred to as "subject-vehicle information". The vehicle information on the other vehicle 10b may sometimes be referred to as "other-vehicle information". Moreover, a determination unit 122 determines whether or not there is a possibility of a collision between the subject vehicle 10a and the other vehicle 10b, based on the subject-vehicle information, the other-vehicle information and the intersection information that are acquired by the acquisition unit 121.

For example, the determination unit 122 determines that there is a possibility of a collision between the subject vehicle 10a and the other vehicle 10b, in a case where all of Conditions 1 to 3 described below are satisfied, as in the case of the traffic state illustrated in FIG. 2.

Condition 1: The subject vehicle 10a is in an intersection, and is about to turn right.
Condition 2: The other vehicle 10b is in the opposite lane, and is about to move forward at the intersection.
Condition 3: A predicted path of the subject vehicle 10a and a predicted path of the other vehicle 10b intersect each other at a same time.

Additionally, FIG. 2 illustrates the traffic state in a case of a left-hand traffic. In the case of a right-hand traffic, Condition 1 described above will be "the subject vehicle 10a is in an intersection, and is about to turn left".

Figure 6:
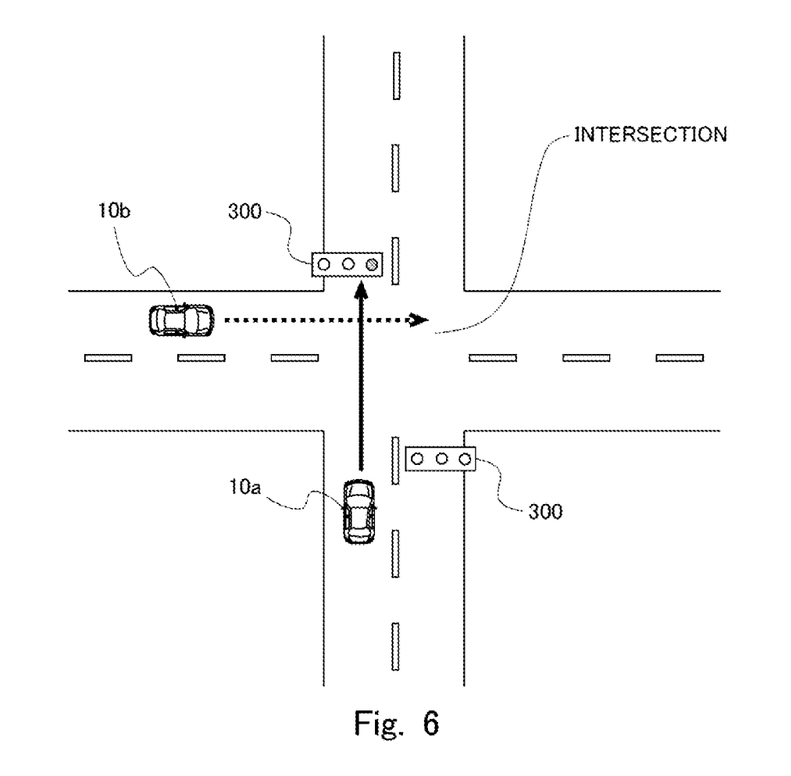
FIG. 6 is a diagram illustrating a second example of the traffic state where an alert is to be issued by the alert system.

Furthermore, FIG. 6 is a diagram illustrating a second example of the traffic state where an alert is to be issued by the alert system. Addonally, also in FIG. 6, as in FIG. 2, a solid-line arrow indicates the traveling direction of the subject vehicle 10a, and a dashed-line arrow indicates the traveling direction of the other vehicle 10b. In FIG. 6, the subject vehicle 10a is about to travel through an intersection where the traffic light is indicating red. For its part, the other vehicle 10b is about to enter the intersection from a direction intersecting the traveling direction of the subject vehicle 10a. If the driver of the subject vehicle 10a drives the subject vehicle 10a in such a state without noticing the other vehicle 10b, the subject vehicle 10a will possibly collide with the other vehicle 10b.

Accordingly, also in the case where all of Conditions 4 to 6 described below are satisfied, as in the case of the traffic state illustrated in FIG. 6, the determination unit 122 determines that there is a possibility of a collision between the subject vehicle 10a and the other vehicle 10b.

Condition 4: The subject vehicle 10a is about to travel through an intersection where the traffic light is indicating red.
Condition 5: The other vehicle 10b is about to enter the intersection from a direction intersecting the traveling direction of the subject vehicle 10a.
Condition 6: A predicted path of the subject vehicle 10a and a predicted path of the other vehicle 10b intersect each other at a same time.

Additionally, in the present embodiment, the traffic states in which the determination unit 122 determines that there is a possibility of a collision between the subject vehicle 10a and the other vehicle 10b are not limited to those illustrated in FIGS. 2 and 6.

In the case where the determination unit 122 determines that there is a possibility of a collision between the subject vehicle 10a and the other vehicle 10b, the controller 120 checks the state of the first alert device 200a. In the case where the first alert device 200a is in an active state, an instruction unit 123 transmits, to the first alert device 200a, an instruction to issue an alert. As a result, an alert is issued by the first alert device 200a to the driver of the subject vehicle 10a.

On the other hand, in the case where the first alert device 200a is in an inactive state, the controller 120 broadcasts the alert information by using the communication unit 110. The alert information that is transmitted at this time includes the vehicle ID for identifying the other vehicle 10b that is determined to possibly collide with the subject vehicle 10a. Then, when the alert information that is broadcast is received by the second on-board device 100E of the other vehicle 10b, an alert is issued by the second alert device 200b to the driver of the other vehicle 10b.

Information Processing

Figure 7:
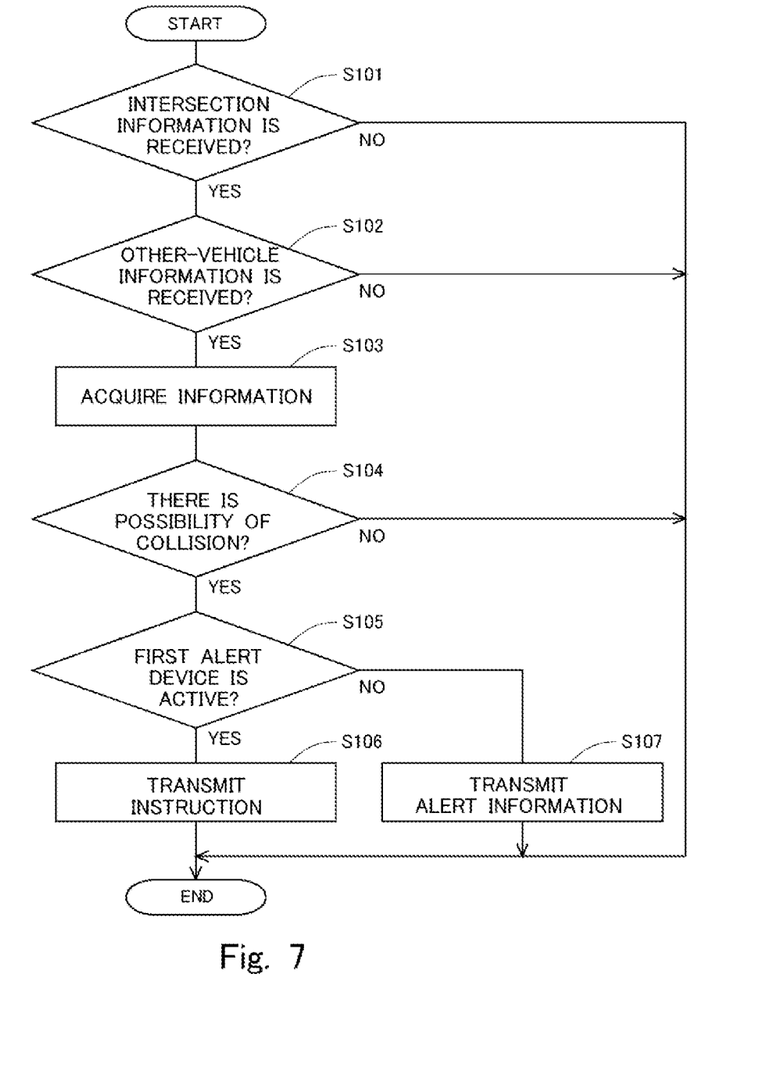
FIG. 7 is a flowchart illustrating a flow of a first alert process that is performed by the first on-board device of a subject vehicle.
Figure 8:
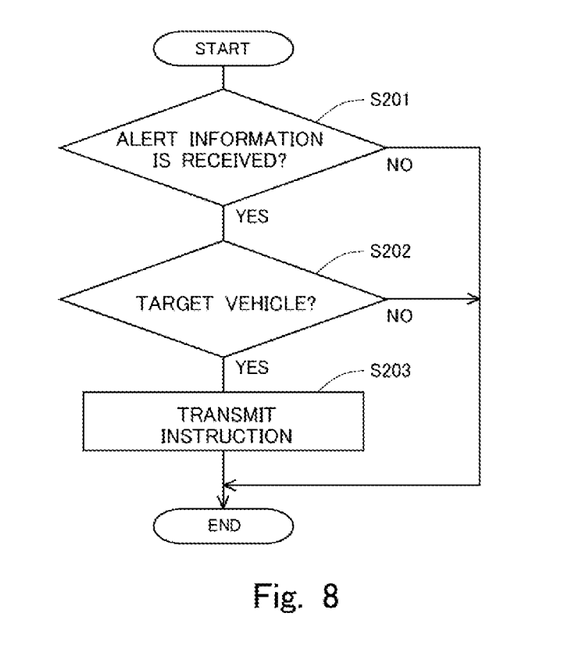
FIG. 8 is a flowchart illustrating a flow of a second alert process that is performed by a second on-board device of another vehicle.

Next, information processing that is performed by the on-board device 100 to issue an alert will be described with reference to FIGS. 7 and 8. FIG. 7 is a flowchart illustrating a flow of a first alert process that is performed by the first on-board device 100a of the subject vehicle 10a. FIG. 8 is a flowchart illustrating a flow of a second alert process that is performed by the second on-board device 100b of the other vehicle 10b.

The flow of the first alert process illustrated in FIG. 7 is repeatedly performed by the controller 120 of the first on-board device 100a every predetermined period of time. In the present flow, first, in S101, whether or not the intersection information that is transmitted by the roadside device 300 is received is determined. As described above, when the roadside device 300 and the subject vehicle 10a are present within a predetermined communicable range, the intersection information that is transmitted by the roadside device 300 is received by the first on-board device 100a. In the case where a negative determination is made in S101, execution of the present flow is temporarily ended.

By contrast, in the case where a positive determination is made in S101, or in other words, in the case where the intersection information is received by the first on-board device 100a, the process in 3102 is performed next. In 3102, whether or not the other-vehicle information that is transmitted by the second on-board device 100b is received is determined. As described above, when the other vehicle 10b and the subject vehicle 10a are present within a predetermined communicable range, the other-vehicle information that is transmitted by the second on-board device 100b is received by the first on-board device 100a. Additionally, at this time, if a plurality of other vehicles 10b are present within the predetermined communicable range, the other-vehicle information on each of the plurality of other vehicles 10b is received. In the case where a negative determination is made in S102, execution of the present flow is temporarily ended.

By contrast, in the case where a positive determination is made in S102, or in other words, in the case where the other-vehicle information is received by the first on-board device 100a, the process in S103 is performed next. In S103, the intersection information, the other-vehicle information, and the subject-vehicle information are acquired. Next, in S104, whether or not there is a possibility of a collision between the subject vehicle 10a and the other vehicle 10b is determined based on the intersection information, the other-vehicle information, and the subject-vehicle information that are acquired in S103. In the case where the other-vehicle information on a plurality of other vehicles 10b is received, whether or not there is a possibility of a collision with the subject vehicle 10a is determined for each of the other vehicles 10b. In the case where a negative determination is made in S104, execution of the present flow is temporarily ended.

By contrast, in the case where a positive determination is made in S104, or in other words, in the case where there is the other vehicle 10b that will possibly collide with the subject vehicle 10a, the process in S105 is performed next. In S105, whether or not the first alert device 200a is in an active state is determined. At this time, if power of the first alert device 200a is off, the first alert device 200a is determined to be in an inactive state. Furthermore, the first alert device 200a is determined to be in an inactive state also in a case where the first alert device 200a is diagnosed as broken by failure diagnosis.

In the case where a positive determination is made in S105, or in other words, in the case where the first alert device 200a is in an active state, the process in S106 is performed next. In S106, an instruction to issue an alert is transmitted to the first alert device 200a. As a result, an alert is issued by the first alert device 200a. The driver of the subject vehicle 10a is thereby notified of the alert.

By contrast, in the case where a negative determination is made in S105, or in other words, in the case where the first alert device 200a is in an inactive state, the process in S107 is performed next. In S107, the alert information is broadcast by the first on-board device 100a. When the process in S106 or S107 is ended, execution of the present flow is temporarily ended.

The flow of the second alert process illustrated in FIG. 8 is repeatedly performed by the controller 120 of the second on-board device 100b every predetermined period of time. In the present flow, first, in 2201, whether or not the alert information that is transmitted by the first on-hoard device 100a is received is determined. The alert information is received by the second on-board device 100b in a case where the alert information is broadcast by the first on-board device 100a as a result of execution of the flow of the first alert process described above (that is, in the case where the process in S107 is performed). In the case where a negative determination is made in S201, execution of the present flow is temporarily ended.

By contrast, in the case where a positive determination is made in S201, the process in S202 is performed next. Here, in the case where the subject vehicle 10a and a plurality of other vehicles 10b are present in a predetermined communicable range, the alert information is received by the second on-board devices 100b of the plurality of other vehicles 10b. That is, the alert information is received not only by the second on-board device 100b of the other vehicle 10b that is determined to possibly collide with the subject vehicle 10a (hereinafter this other vehicle 10b will be sometimes referred to as a "target vehicle"), but also by the second on-board device(s) 100b of the other vehicle(s) 10b other than the target vehicle. Accordingly, in S202, whether or not the vehicle that received the alert information is the target vehicle is determined based on the vehicle ID of the other vehicle 10b included in the alert information (that is, the vehicle ID of the target vehicle). In the case where a negative determination is made in S202, execution of the present flow is temporarily ended. That is, an alert is not issued by the second alert device(s) 200b in the other vehicle(s) 101 other than the target vehicle.

By contrast, in the case where a positive determination is made in S202, or in other words, in the case where the vehicle that received the alert information is the target vehicle, the process in S203 is performed next. In S203, an instruction to issue an alert is transmitted to the second alert device 200b. As a result, an alert is issued by the second alert device 200b. The driver of the other vehicle 10b that is the target vehicle is thereby notified of the alert.

Modification

In the embodiment described above, in the alert system 1, transmission/reception of the vehicle information and the alert information between the first on-board device 100a of the subject vehicle 10a and the second on-board device 100b of the other vehicle 10b are performed through vehicle-to-vehicle communication. However, in a case where the roadside device 300 that is capable of road-to-vehicle communication is installed at the intersection, vehicle-to-vehicle communication does not necessarily have to be performed between the subject vehicle 10a and the other vehicle 10b. That is, transmission/reception of information between the first on-board device 100a and the second on-board device 100b may be performed through road-to-vehicle communication via the roadside device 300. In this case, the vehicle information that is transmitted by one of the first on-board device 100a and the second on-board device 100b is received by the roadside device 300. Moreover, the vehicle information is transmitted by she roadside device 300 to the other one of the first on-board device 100a and the second on-board device 100b. Furthermore, the alert information that is transmitted by the first on-board device 100a is received by the roadside device 300. Furthermore, the alert information is transmitted by the roadside device 300 to the second on-board device 100b.

Second Embodiment

Figure 9:
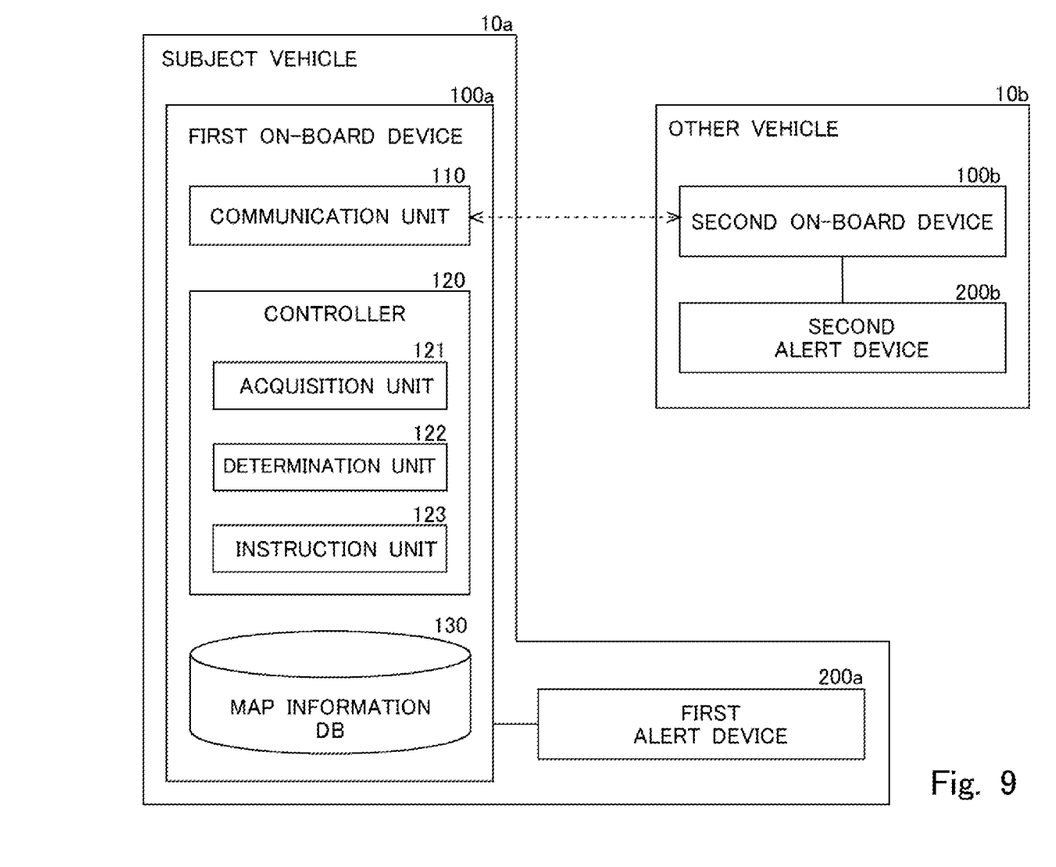
FIG. 9 is a block diagram schematically illustrating an example of a functional configuration of the first on-board device according to a second embodiment.

An alert system according to a present embodiment is different from that in the first embodiment in that the roadside device is not included. A functional configuration of the on-board device 100 in the alert system 1 according to the present embodiment will be described with reference to FIG. 9. FIG. 9 is a block diagram schematically illustrating an example of a functional configuration of the first on-board device 100a according to the present embodiment.

As illustrated in FIG. 9, in the present embodiment, the first on-board device 100a includes, in addition to the communication unit 110a and the controller 120a, a map information database (a map information DB) 130, Map information including road information for travelling of vehicles is stored in the map information DB 130.

In the present embodiment, the controller 120a detects that the subject vehicle 10a is traveling through or around an intersection, based on the position information on the subject vehicle 10a and the map information stored in the map infor information DP 130. Furthermore, the acquisition unit 121 acquires intersection information including the road alignment at the intersection and information about presence/absence of a stop line and the like, based on the map information stored in the map information DB 130. Moreover, the determination unit 122 determines whether or not there is a possibility of a collision between the subject vehicle 10a and the other vehicle 10b, based on the other-vehicle information, the subject-vehicle information, and the intersection information that is acquired based on the map information.

Figure 10:
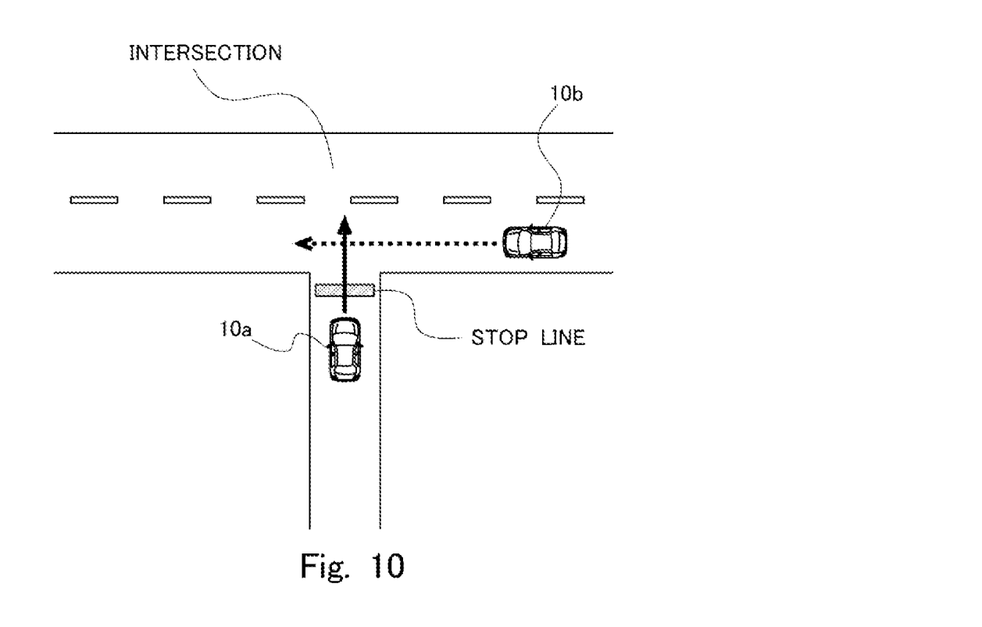
FIG. 10 is a diagram illustrating a third example of the traffic state where an alert is to be issued by the alert system.

FIG. 10 is a diagram illustrating a third example of the traffic state where an alert is to be issued by the alert system ditionally, also in FIG. 10, as in FIG. 2, a solid-line arrow indicates the traveling direction of the subject vehicle 10a, and a dashed-line arrow indicates the traveling direction of the other vehicle 10b. In FIG. 10, the subject vehicle 10a is about to enter the intersection after temporarily stopping before the intersection (before a stop line), For its part, the other vehicle 10b is about to enter the intersection from a direction different from that of the subject vehicle 10a. In the driver of the subject vehicle 10a drives the subject vehicle 10a in such a state without noticing the other vehicle 10b, the subject vehicle 10a will possibly collide with the other vehicle 10b.

Accordingly, the determination unit 122 determines that there is a possibility of a collision between the subject vehicle 10a and the other vehicle 10b, in a case where all of Conditions 7 to 9 described below are satisfed, as in the case of the traffic state illustrated in FIG. 10.

Condition 7: The subject vehicle 10a is about to enter an intersection after temporarily stopping before the intersection.

Condition 8: The other vehicle 10b is about to enter the intersection from a direction different from that of the subject vehicle 10a.

Condition 9: A predicted path of the subject vehicle 10a and a predicted path of the other vehicle 10b intersect each other at a same time.

Additionally, in the present embodiment, the traffic state in which the determination unit 122 determines that there is a possibility of a collision between the subject vehicle 10a and the other vehicle 10b is not limited to the one illustrated in FIG. 10.

As described above, according to the present embodiment, whether or not there is a possibility of a collision between the subject vehicle 10a and the other vehicle 10b may be determined also at an intersection where the roadside device capable of road-to-vehicle communication is not installed. Additionally, also in the present embodiment, the process for issuing an alert performed by the controller 120a in the case where the subject vehicle 10a is determined by the determination unit 122 to possibly collide with the other vehicle 10b is the same as that in the first embodiment.

In the first and second embodiments described above, the process for issuing an alert, of the alert system 1, is described citing, as an example, a case where there is a possibility of a collision between the subject vehicle 10a and the other vehicle 10b at an intersection. However, the information processing device, the information processing method, and the system according to the present disclosure are also applicable to a case where there is a possibility of a collision between the subject vehicle and the other vehicle at locations other than the intersection.

Other Embodiments

The embodiments described above are merely examples, and the present disclosure may be changed and implemented as appropriate within the scope of the disclosure. Furthermore, processes and means described in the present disclosure may be freely combined to the extent that no technical conflict exists.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the CGmpULer reading out and executing the programs. Such computer programs may be provided to the computer by a non-transitory computer-readable storage medium that can be connected to a system bus of the computer, or may be provided to the computer through a network. The non-transitory computer-readabie storage medium may be any type of disk including magnetic disks (floppy (registered trademark) disks, hard disk drives (HDDs), etc.) and optical disks (CD-ROMs, DVD discs, Blu-ray discs, etc.), and any type of medium suitable for storing electronic instructions, such as read-only memories (ROMs), random access memories (RAMs), EPROMs, EEPROMs, magnetic cards, flash memories, or optical cards.

What is claimed is:

1. An information processing device comprising a controller configured to, in a case where it is determined that there is a possibility of a collision between a subject vehicle and an other vehicle:
    determine whether a first alert device for issuing an alert to a driver of the subject vehicle is in an active state based on a state of the first alert device that power of the first alert device is off or not, and that the first alert device is broken or not;
    determine that the first alert device is in the active state in a case where the power of the first alert device is on, and the first alert device is not broken;
    cause the first alert device to issue the alert in response to the first alert device being in the active state;
    determine that the first alert device is in an inactive state in a case where the power of the first alert device is off, or the first alert device is broken; and
    transmit alert information to the other vehicle in response to the first alert device being in the inactive state.

2. The information processing device according to claim 1, wherein the alert information is information for causing a second alert device in the other vehicle to issue an alert, the second alert device being for issuing an alert to a driver of the other vehicle.

3. The information processing device according to claim 1, wherein the controller determines whether or not there is a possibility of a collision between the subject vehicle being about to turn left or right at an intersection and the other vehicle in an opposite lane being about to move forward at the intersection.

4. The information processing device according to claim 1, wherein the controller determines whether or not there is a possibility of a collision between the subject vehicle being about to travel through an intersection where a traffic light is indicating red and the other vehicle being about to enter the intersection from a direction intersecting a traveling direction of the subject vehicle.

5. The information processing device according to claim 1, wherein the controller determines whether or not there is a possibility of a collision between the subject vehicle being about to enter an intersection after temporarily stopping before the intersection and the other vehicle being about to enter the intersection from a different direction from the subject vehicle.

6. The information processing device according to claim 3, wherein the controller
    acquires information indicating a driving state of the subject vehicle, information indicating a driving state of the other vehicle, and information indicating a state of the intersection, and
    determines whether or not there is a possibility of a collision between the other vehicle and the subject vehicle, based on pieces of the information acquired.

7. The information processing device according to claim 1, wherein the information processing device is an on-board device mounted in the subject vehicle.

8. The information processing device according to claim 7, wherein the controller transmits the alert information to the other vehicle through vehicle-to-vehicle communication.

9. The information processing device according to claim 7, wherein the controller transmits the alert information to the other vehicle through road-to-vehicle communication via a roadside device.

10. An information processing method performed by a computer, the method comprising:
    determining whether or not there is a possibility of a collision between a subject vehicle and an other vehicle;
    in a case where it is determined that there is the possibility of the collision between the subject vehicle and the other vehicle, determining whether a first alert device for issuing an alert to a driver of the subject vehicle is in an active state based on a state of the first alert device that power of the first alert device is off or not, and that the first alert device is broken or not;
    determining that the first alert device is in the active state in a case where the power of the first alert device is on, and the first alert device is not broken;
    causing the first alert device to issue the alert in response to the first alert device being in the active state;
    determine that the first alert device is in an inactive state in a case where the power of the first alert device is off, or the first alert device is broken; and
    transmitting alert information to the other vehicle in response to the first alert device is in the inactive state.

11. The information processing method according to claim 10, wherein the alert information is information for causing a second alert device in the other vehicle to issue an alert, the second alert device being for issuing an alert to a driver of the other vehicle.

12. The information processing method according to claim 10, wherein whether or not there is a possibility of a collision between the subject vehicle being about to turn left or right at an intersection and the other vehicle in an opposite lane being about to move forward at the intersection is determined.

13. The information processing method according to claim 12, further comprising acquiring information indicating a driving state of the subject vehicle, information indicating a driving state of the other vehicle, and information indicating a state of the intersection, wherein
    whether or not there is a possibility of a collision between the other vehicle and the subject vehicle is determined based on pieces of the information acquired.

14. The information processing method according to claim 10, wherein whether or not there is a possibility of a collision between the subject vehicle being about to travel through an intersection where a traffic light is indicating red and the other vehicle being about to enter the intersection from a direction intersecting a traveling direction of the subject vehicle is determined.

15. The information processing method according to claim 10, wherein whether or not there is a possibility of a collision between the subject vehicle being about to enter an intersection after temporarily stopping before the intersection and the other vehicle being about to enter the intersection from a different direction from the subject vehicle is determined.

16. The information processing method according to claim 10, wherein the computer is an on-board device mounted in the subject vehicle.

17. The information processing method according to claim 16, wherein the alert information is transmitted to the other vehicle through vehicle-to-vehicle communication.

18. The information processing method according to claim 16, wherein the alert information is transmitted to the other vehicle through road-to-vehicle communication via a roadside device.

19. A system including a first on-board device and a first alert device mounted in a subject vehicle, and a second on-board device and a second alert device mounted in an other vehicle, wherein
 the first alert device is a device that issues an alert to a driver of the subject vehicle,
 the second alert device is a device that issues an alert to a driver of the other vehicle, and
 in a case where it is determined that there is a possibility of a collision between the subject vehicle and the other vehicle, the first on-board device:
  determines whether a first alert device for issuing an alert to a driver of the subject vehicle is in an active state based on a state of the first alert device that power of the first alert device is off or not, and that the first alert device is broken or not;
  determines that the first alert device is in the active state in a case where the power of the first alert device is on, and the first alert device is not broken;
  causes the first alert device to issue the alert in response to the first alert device being in the active state;
  determines that the first alert device is in an inactive state in a case where the power of the first alert device is off, or the first alert device is broken; and
  transmits alert information to the second on-board device in response to the first alert device being in the inactive state, the alert information being for causing the second alert device to issue the alert.

20. The system according to claim 19, wherein the first on-board device transmits the alert information to the second on-board device through vehicle-to-vehicle communication.

* * * * *